United States Patent
Nishimura

(10) Patent No.: US 10,407,870 B2
(45) Date of Patent: Sep. 10, 2019

(54) HYDRAULIC EXCAVATOR

(71) Applicant: KOMATSU LTD., Tokyo (JP)

(72) Inventor: Minetaka Nishimura, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/126,007

(22) Filed: Sep. 10, 2018

(65) Prior Publication Data

US 2019/0003151 A1    Jan. 3, 2019

Related U.S. Application Data

(63) Continuation of application No. 15/699,082, filed on Sep. 8, 2017, now Pat. No. 10,100,492, which is a continuation of application No. 15/194,899, filed on Jun. 28, 2016, now Pat. No. 9,783,957, which is a continuation of application No. 14/645,593, filed on Mar. 12, 2015, now Pat. No. 9,425,499, which is a continuation of application No. 14/003,337, filed as application No. PCT/JP2012/079385 on Nov. 13, 2012, now Pat. No. 9,016,419.

(51) Int. Cl.
| | |
|---|---|
| *E02F 9/08* | (2006.01) |
| *H01Q 1/27* | (2006.01) |
| *E02F 9/16* | (2006.01) |
| *E02F 9/18* | (2006.01) |
| *G01S 19/42* | (2010.01) |
| *E02F 3/32* | (2006.01) |

(52) U.S. Cl.
CPC .......... *E02F 9/0866* (2013.01); *E02F 9/0833* (2013.01); *E02F 9/0858* (2013.01); *E02F 9/163* (2013.01); *E02F 9/18* (2013.01); *G01S 19/42* (2013.01); *H01Q 1/27* (2013.01); *E02F 3/32* (2013.01)

(58) Field of Classification Search
CPC . E02F 9/0866; E02F 9/18; E02F 9/163; E02F 9/0833; E02F 9/0858; E02F 3/32; G01S 19/42; H01Q 1/27
See application file for complete search history.

(56) References Cited

U.S. PATENT DOCUMENTS

| | | |
|---|---|---|
| 6,782,644 B2 | 8/2004 | Fujishima et al. |
| 7,780,213 B2 | 8/2010 | Kim |
| 7,854,471 B2 | 12/2010 | Fujii et al. |

(Continued)

FOREIGN PATENT DOCUMENTS

| | | |
|---|---|---|
| JP | 2002-322676 A | 11/2002 |
| JP | 2005-267568 A | 9/2005 |

(Continued)

OTHER PUBLICATIONS

International Search Report for the corresponding international application No. PCT/JP2012/079385, dated Feb. 19, 2013.

*Primary Examiner* — Darlene P Condra
(74) *Attorney, Agent, or Firm* — Global IP Counselors, LLP

(57) ABSTRACT

A hydraulic excavator includes an upper revolving unit revolvably mounted on a lower traveling unit. A counterweight is disposed on a rear end part of the upper revolving unit. A first GNSS antenna supporting part is configured to support a first GNSS antenna. The first GNSS antenna supporting part is disposed in front of the counterweight on the upper revolving unit.

12 Claims, 5 Drawing Sheets

(56) References Cited

U.S. PATENT DOCUMENTS

| | | |
|---|---|---|
| 7,925,439 B2 | 4/2011 | McCain |
| 2004/0148815 A1 | 8/2004 | Chikaishi et al. |
| 2005/0210718 A1 | 9/2005 | Ueda et al. |
| 2007/0168101 A1* | 7/2007 | Shibamori ................ E02F 9/26 701/50 |
| 2009/0049718 A1 | 2/2009 | Tanaka |
| 2009/0084004 A1 | 4/2009 | Kim |
| 2010/0033388 A1 | 2/2010 | Miller et al. |
| 2010/0034421 A1 | 2/2010 | Roberts et al. |
| 2010/0206927 A1 | 8/2010 | Noda et al. |
| 2012/0068432 A1 | 3/2012 | Tanaka et al. |
| 2013/0166143 A1 | 6/2013 | Seki |
| 2013/0272266 A1* | 10/2013 | Nishida ............. H04W 36/0022 370/331 |
| 2013/0275035 A1 | 10/2013 | Taylor et al. |
| 2013/0297046 A1 | 11/2013 | Hendron et al. |
| 2013/0325568 A1 | 12/2013 | Mangalvedkar et al. |

FOREIGN PATENT DOCUMENTS

| | | |
|---|---|---|
| JP | 2008-102097 A | 5/2008 |
| JP | 2012-219516 A | 11/2012 |
| WO | 2010147131 A1 | 12/2010 |

\* cited by examiner

HYDRAULIC EXCAVATOR

CROSS-REFERENCE TO RELATED APPLICATIONS

This application is a continuation of U.S. patent application Ser. No. 15/699,082, filed on Sep. 8, 2017, which is a continuation of U.S. patent application Ser. No. 15/194,899 filed on Jun. 28, 2016, now U.S. Pat. No. 9,783,957, issued on Oct. 10, 2017, which is a continuation of U.S. patent application Ser. No. 14/645,593, now U.S. Pat. No. 9,425,499, issued on Aug. 23, 2016, which is a continuation of U.S. patent application Ser. No. 14/003,337, filed on Sep. 5, 2013, now U.S. Pat. No. 9,016,419, issued on Apr. 28, 2015, which is a U.S. National phase application of International Application No. PCT/JP2012/079385 filed on Nov. 13, 2012. The entire contents of U.S. patent application Ser. Nos. 14/003,337, 14/645,593, 15/194,899, and 15/699,082 are hereby incorporated herein by reference.

BACKGROUND

The present invention relates to a hydraulic excavator that can be equipped with a GNSS antenna.

Background Information

A hydraulic excavator equipped with an antenna for a Real Time Kinematic-Global Navigation Satellite System (RTK-GNSS) is known in the prior art (e.g., see Japanese Patent Laid-open No. 2008-102097). The antennas are mounted on pole-like antenna supporting parts that stand on a counterweight provided at the rear of an upper revolving unit.

SUMMARY

However, large acceleration is applied to the antennas when the upper revolving unit starts or finishes rotating since the counterweight is disposed on the rear end part of the upper revolving unit. As a result, the size and weight of the antenna supporting parts are increased in order to strengthen the antenna supporting parts.

An object of the present invention is to provide a hydraulic excavator in which a first antenna supporting part is disposed in front of a counterweight on an upper revolving unit of the hydraulic excavator.

A hydraulic excavator according to a first aspect of the present invention includes an upper revolving unit revolvably mounted on a lower traveling unit. A counterweight is disposed on a rear end part of the upper revolving unit. A first GNSS antenna supporting part is configured to support a first GNSS antenna. The first GNSS antenna supporting part is disposed in front of the counterweight on the upper revolving unit.

The hydraulic excavator according to a second aspect of the present invention is related to the first aspect, wherein a handrail is disposed in front of the first GNSS antenna supporting part on the upper revolving unit.

The hydraulic excavator according to a third aspect of the present invention is related to the second aspect, wherein the handrail is disposed on an edge of a passage on the upper revolving unit.

The hydraulic excavator according to a fourth aspect of the present invention is related to the first aspect, wherein the first GNSS antenna supporting part is disposed on a right side of a front-rear center line of a vehicle body.

The hydraulic excavator according to a fifth aspect of the present invention is related to the fourth aspect, wherein a second GNSS antenna supporting part is configured to support a second GNSS antenna. The second GNSS antenna supporting part is disposed on a left side of the front-rear center line of the vehicle body.

The hydraulic excavator according to a sixth aspect of the present invention is related to the fifth aspect, wherein a cab is disposed in front of the counterweight on the upper revolving unit, and the second GNSS antenna supporting part is disposed between the counterweight and the cab.

The hydraulic excavator according to a seventh aspect of the present invention is related to the sixth aspect, wherein an engine room is disposed in front of the counterweight on the upper revolving unit. The first GNSS antenna supporting part is disposed in front of the engine room.

The hydraulic excavator according to an eighth aspect of the present invention is related to the seventh aspect, wherein the second GNSS antenna supporting part is disposed in front of the engine room.

A hydraulic excavator according to a ninth aspect of the present invention includes an upper revolving unit revolvably mounted on a lower traveling unit. A counterweight is disposed on a rear end part of the upper revolving unit. A structure is disposed in front of the counterweight on the upper revolving unit. An upper surface of the structure has a substantially flat area. A first GNSS antenna supporting part is configured to support a first GNSS antenna. A second GNSS antenna supporting part is configured to support a second GNSS antenna. Each of the first and second GNSS antenna supporting parts is disposed above the substantially flat area in front of the counterweight.

The hydraulic excavator according to a tenth aspect of the present invention is related to the ninth aspect, wherein the first GNSS antenna supporting part is disposed on a right side of a front-rear center line of the hydraulic excavator, and the second GNSS antenna supporting part is disposed on a left side of the front-rear center line.

The hydraulic excavator according to an eleventh aspect of the present invention is related to the tenth aspect, wherein each of the first and second GNSS antenna supporting parts is disposed on an edge of the substantially flat area.

The hydraulic excavator according to a twelfth aspect of the present invention is related to the tenth aspect, wherein a handrail is disposed in front of at least one of the first and second GNSS antenna supporting parts on the upper revolving unit.

The hydraulic excavator according to a thirteenth aspect of the present invention is related to the eleventh aspect, wherein a handrail is disposed in front of at least one of the first and second GNSS antenna supporting parts on the upper revolving unit.

According to the present invention, a hydraulic excavator can be provided in which a first antenna supporting part is disposed in front of the counterweight on the upper revolving unit.

DESCRIPTION OF EXEMPLARY EMBODIMENTS

Figure 1:
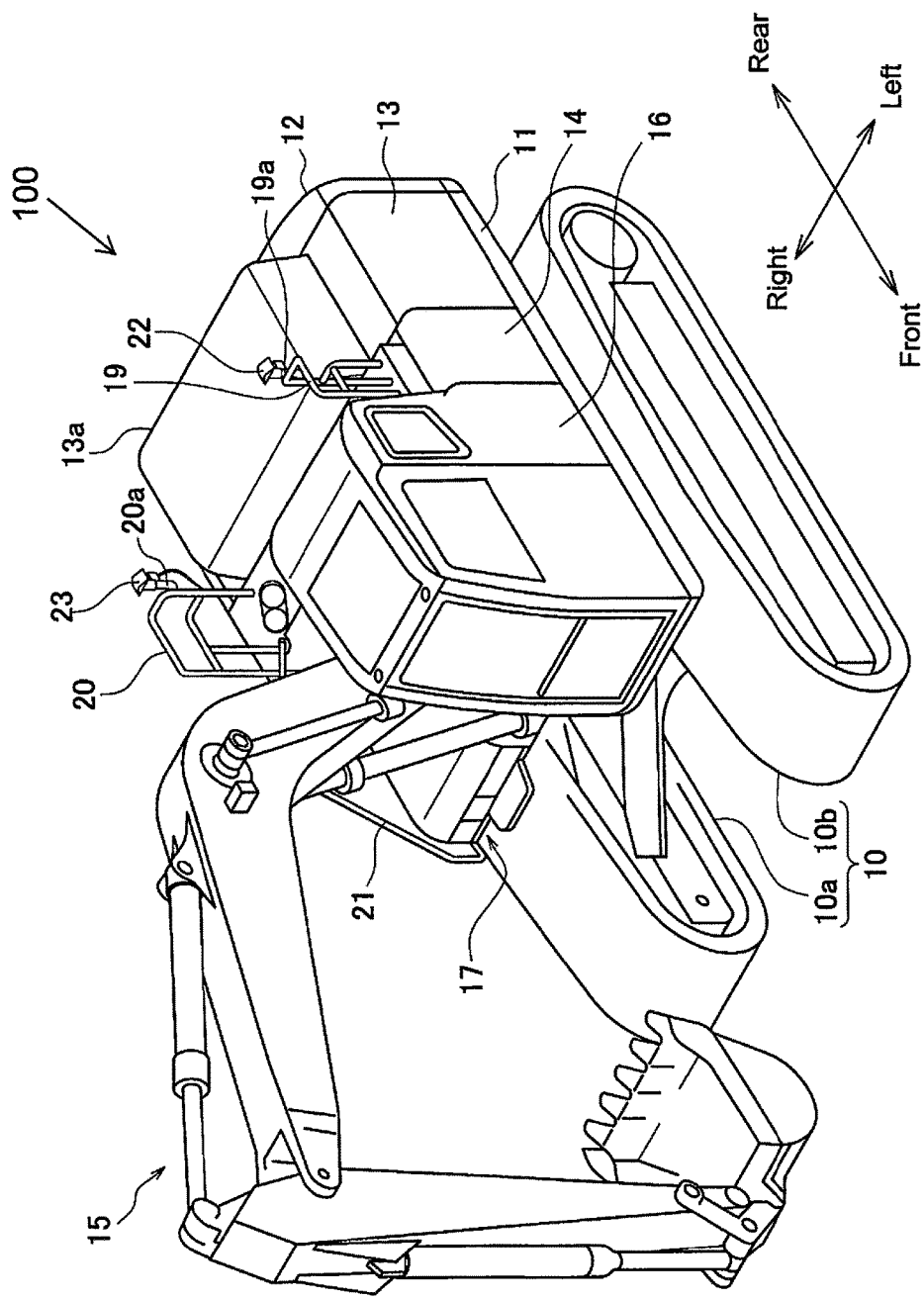
FIG. 1 is a frontal perspective view of a hydraulic excavator.

Next, an exemplary embodiment of the present invention will be explained with reference to the drawings. In the following description of the drawings, identical or similar parts are given identical or similar reference numerals. However, the drawings are schematic and dimensional ratios and the like may differ from the actual objects. Therefore, detailed dimensions and the like should be determined in consideration of the following drawings. Moreover, it is needless to say that parts with mutually different dimensional relationships or ratios are included in mutual relationships in the drawings.

In the following description, "up," "down," "front," "rear," "left," and "right" are terms used on the basis of an operator sitting in an operator's seat.

Configuration of Work Vehicle

Figure 2:
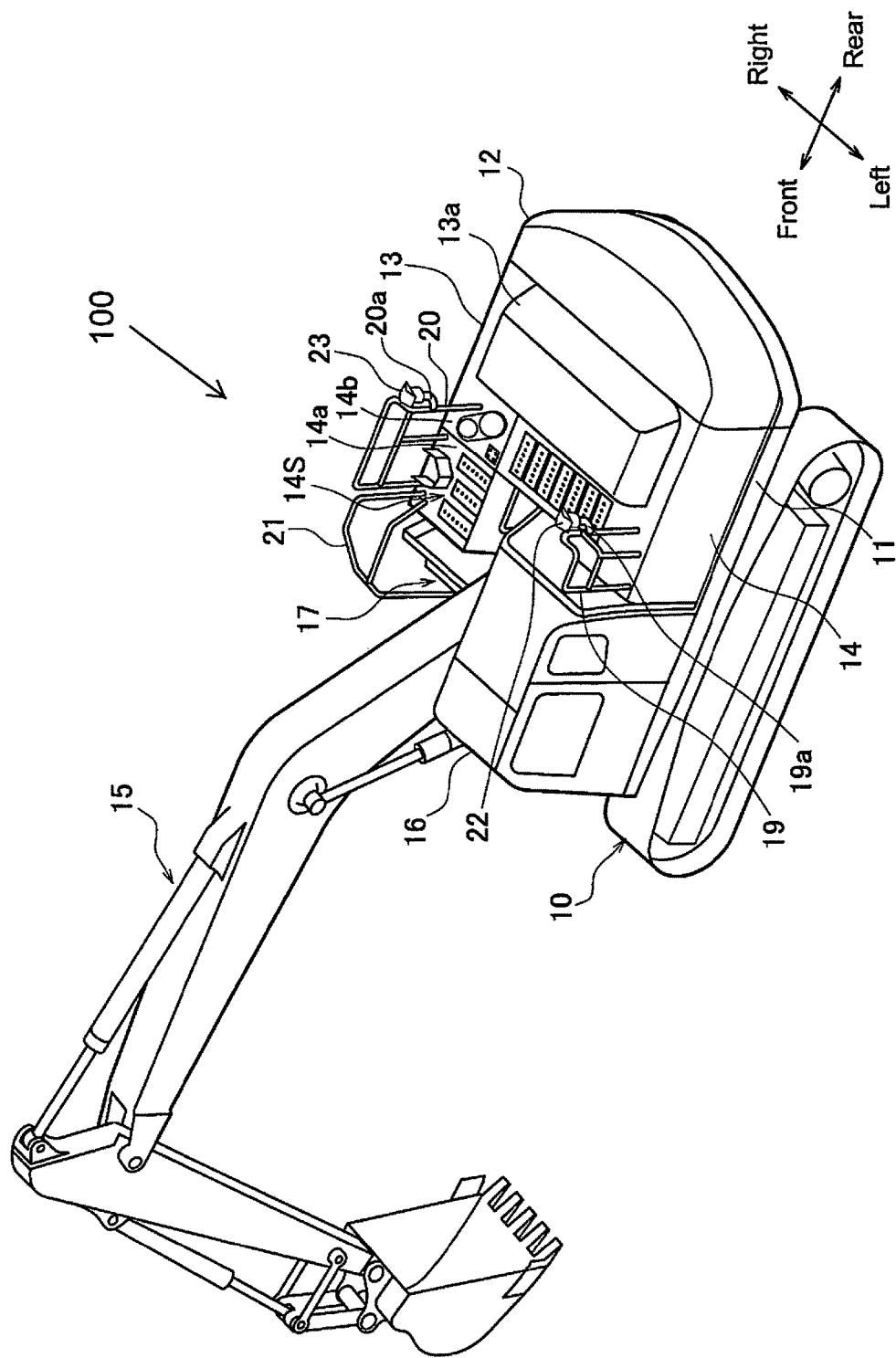
FIG. 2 is a rear perspective view of the hydraulic excavator.

A configuration of a hydraulic excavator 100 according to an embodiment shall be explained in detail with reference to the drawings. FIG. 1 is a front perspective view of the hydraulic excavator 100. FIG. 2 is a rear perspective view of the hydraulic excavator 100.

The hydraulic excavator 100 includes a lower traveling unit 10, an upper revolving unit 11, a counterweight 12, an engine compartment 13, an equipment compartment 14, work implement 15, a cab 16, a steps 17, a first handrail 19, a second handrail 20, a third handrail 21, a first GNSS antenna 22, and a second GNSS antenna 23.

The lower traveling unit 10 includes a pair of rotatable crawlers 10a, 10b that operate independently of each other. The hydraulic excavator 100 moves back and forth and left and right by rotating the pair of crawlers 10a, 10b.

The upper revolving unit 11 is mounted in a rotatable manner on the lower traveling unit 10. The upper revolving unit 11 is rotatable about a center of rotation CP (see FIG. 3) that is parallel to the vertical direction. The upper revolving unit 11 constitutes the vehicle body frame of the hydraulic excavator 100. The counterweight 12, the equipment compartment 14, the engine compartment 13, and the cab 16 are disposed on the upper revolving unit 11

The counterweight 12 is disposed on the rear end part of the upper revolving unit 11. The counterweight 12 is formed by inserting waste steel or concrete into a box assembled from steel plates. The counterweight 12 is used to maintain balance while doing excavation work and the like.

The engine compartment 13 is disposed on the upper revolving unit 11. The engine compartment 13 is disposed in front of the counterweight 12. The engine compartment 13 is disposed behind the equipment compartment 14. The engine compartment 13 accommodates an engine and an exhaust gas treatment device and the like that are not illustrated in the drawings. An engine hood 1a that can be opened and closed is disposed above the engine compartment 13. The operator can stand on a passage 18 and open the engine hood 1a when conducting maintenance inside the engine compartment 13.

The equipment compartment 14 is disposed between the engine compartment 13 and the work implement 15 and between the engine compartment 13 and the cab 16 on the upper revolving unit 11. The equipment compartment 14 includes a fuel tank 14a and an operating fluid tank 14b. In the present embodiment, an upper surface 14S of the equipment compartment 14 is formed in an L shape as illustrated in FIG. 2.

The work implement 15 is mounted in a swingable manner at the front side of the upper revolving unit 11. The work implement 15 is disposed in front of the equipment compartment 14. The work implement 15 is supported by the upper revolving unit 11 between the cab 16 and the steps 17.

The cab 16 is disposed on the upper revolving unit 11. The cab 16 is provided in front of the equipment compartment 14 and to the left of the work implement 15 to allow the operator to view the movement of the work implement 15. An operator's seat in which the operator sits is provided inside the cab 16.

The steps 17 is disposed at the front right of the equipment compartment 14. The steps 17 is used for climbing up and down between the ground and the passage 18.

The passage 18 is formed on the equipment compartment 14. The passage 18 is a substantially flat area of the upper surface 14S of the equipment compartment 14. In other words, the passage 18 is an area where the operator can place his feet of the upper surface 14S of the equipment compartment 14. The passage 18 according to the present embodiment is formed in an L shape in accordance with the shape of the upper surface 14S of the equipment compartment 14. A non-slip conduct is applied to the surface of the passage 18. Specifically, a plurality of half-spherical protrusions are formed on the surface of the passage 18. The non-slip conduct may be formed on the surface of the passage 18.

The first and second handrails 19, 20 are disposed on the equipment compartment 14. The first and second handrails 19, 20 are provided at the edges of the passage 18 and are used by the operator standing on the passage 18 to support his body. The first handrail 19 and the second handrail 20 are separated from each other in the left-right direction. Thus, the operator standing between the first handrail 19 and the second handrail 20 is able to open the engine hood 1a to conduct maintenance inside the engine compartment 13. The first handrail 19 is disposed on the left end of the equipment compartment 14. The second handrail 20 is disposed on the right end of the equipment compartment 14. The second handrail 20 is disposed on the fuel tank 14a and the operating fluid tank 14b.

In the present embodiment, both the first and second handrails 19, 20 take the form of an L shape when viewed from above. Specifically, one side of the L shape extends in the front-back direction along the both side edges of the upper revolving unit 11, and the other side of the L shape extends from the rear end of the one side toward the inside of the upper revolving unit 11.

A first antenna supporting part 19a is connected to the first handrail 19. The first antenna supporting part 19a is a bracket for attaching the first GNSS antenna 22. Similarly, a second antenna supporting part 20a is connected to the second handrail 20. The second antenna supporting part 20a is a bracket for attaching the second GNSS antenna 23. Disposition and configuration of the first and second antenna supporting parts 19a, 20a are explained below.

The third handrail 21 is disposed in front of the first handrail 19 and to the right of the steps 17. The third handrail 21 is used by the operator to support his body while ascending and descending the steps 17.

The first and second GNSS antennas 22, 23 are antennas used for a Real Time Kinematic-Global Navigation Satellite System (RTK-GNSS). The first and second GNSS antennas 22, 23 are disposed above the passage 18. The first GNSS antenna 22 is attached to the first antenna supporting part 19*b* of the first handrail 19. The second GNSS antenna 22 is attached to the second antenna supporting part 20*b* of the second handrail 20.

Disposition of First and Second Antenna Supporting Parts 19*a*, 20*a*

Figure 3:
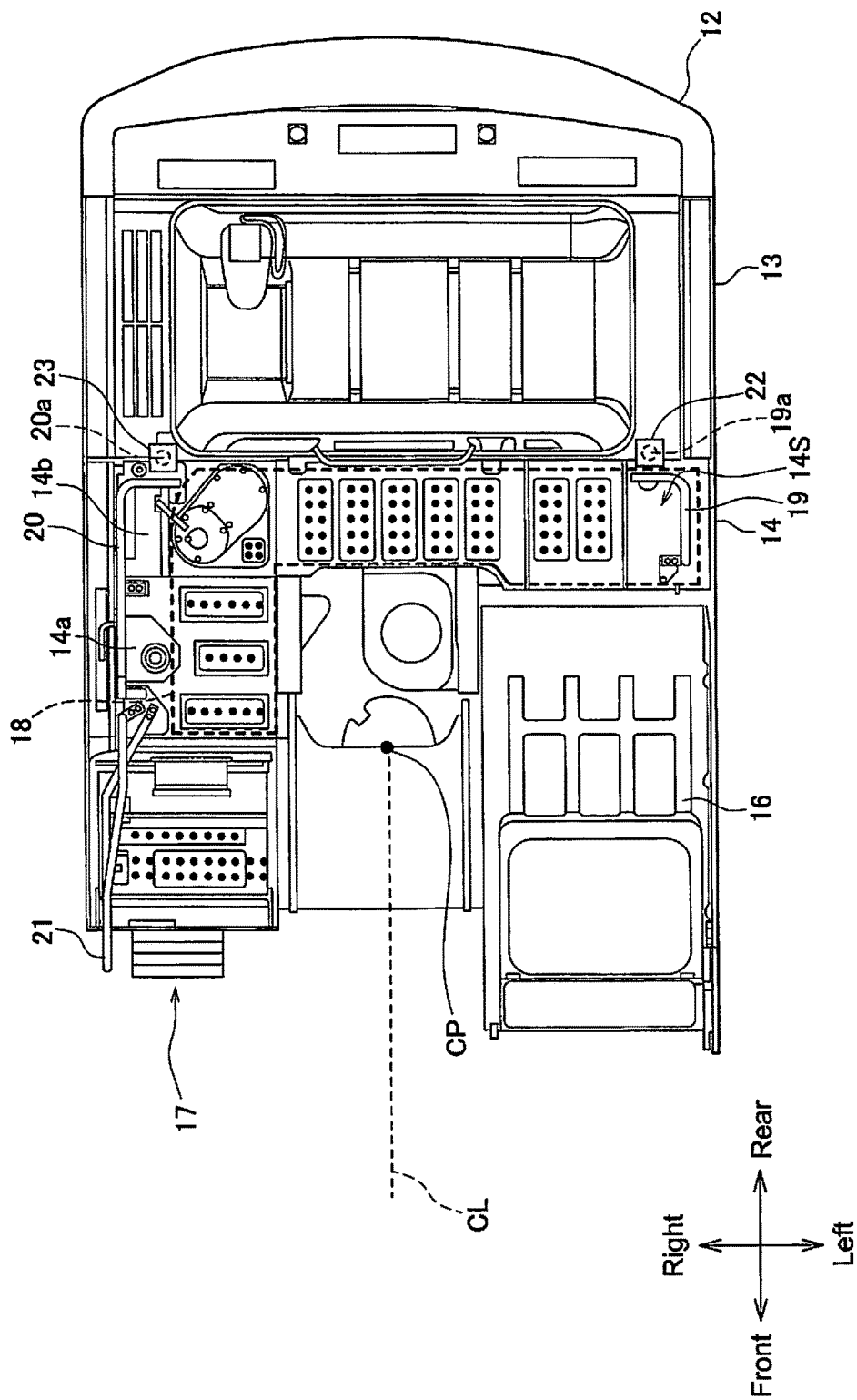
FIG. 3 is a top view of an equipment compartment.

Next, the disposition of the first and second antenna supporting parts 19*a*, 20*a* is described with reference to the drawing. FIG. 3 is a top view of the upper revolving unit 11 and illustrates the location of the equipment compartment 14 and the like.

The first and second antenna supporting parts 19*a*, 20*a* are located on a boundary line between the engine compartment 13 and the equipment compartment 14. The front side portions of the first and second antenna supporting parts 19*a*, 20*a* are located above the equipment compartment 14. The rear side portions of the first and second antenna supporting parts 19*a*, 20*a* are located above the engine compartment 13. In this way, the front side portions of the first and second antenna supporting parts 19*a*, 20*a* are located between the engine compartment 13 and the cab 16 in the front-back direction.

Since the center of rotation CP of the upper revolving unit 11 is located to the right of the cab 16, the first and second antenna supporting parts 19*a*, 20*a* are located to the rear of the center of rotation CP.

The first and second antenna supporting parts 19*a*, 20*a* are respectively connected to the first and second handrails 19, 20. The first and second handrails 19, 20 are separated from each other to the left and right relative to the center line CL in the front-rear direction of the hydraulic excavator 100, as shown in FIG. 3. The first and second antenna supporting parts 19*a*, 20*a* are disposed to the right and left relative to the center line CL. The first and second antenna supporting parts 19*a*, 20*a* according to the present embodiment are located symmetrically on the right and left relative to the center line CL.

The first and second antenna supporting parts 19*a*, 20*a* are respectively located to the rear of the first and second handrails 19, 20. The first and second antenna supporting parts 19*a*, 20*a* are located to the rear of the passage 18.

Since the first and second GNSS antennas 22, 23 are respectively attached to the first and second antenna supporting parts 19*a*, 20*a*, the disposition locations of the first and second GNSS antennas 22, 23 are similar to the disposition locations of the abovementioned first and second antenna supporting parts 19*a*, 20*a*.

Configuration of First and Second Antenna Supporting Parts 19*a*, 20*a*)

Next, the configuration of the first and second antenna supporting parts 19*a*, 20*a* is explained with reference to the drawings. The following is an explanation of the configuration of the second antenna supporting part 20*a* since the first and second antenna supporting parts 19*a*, 20*a* have the same configuration.

Figure 4:
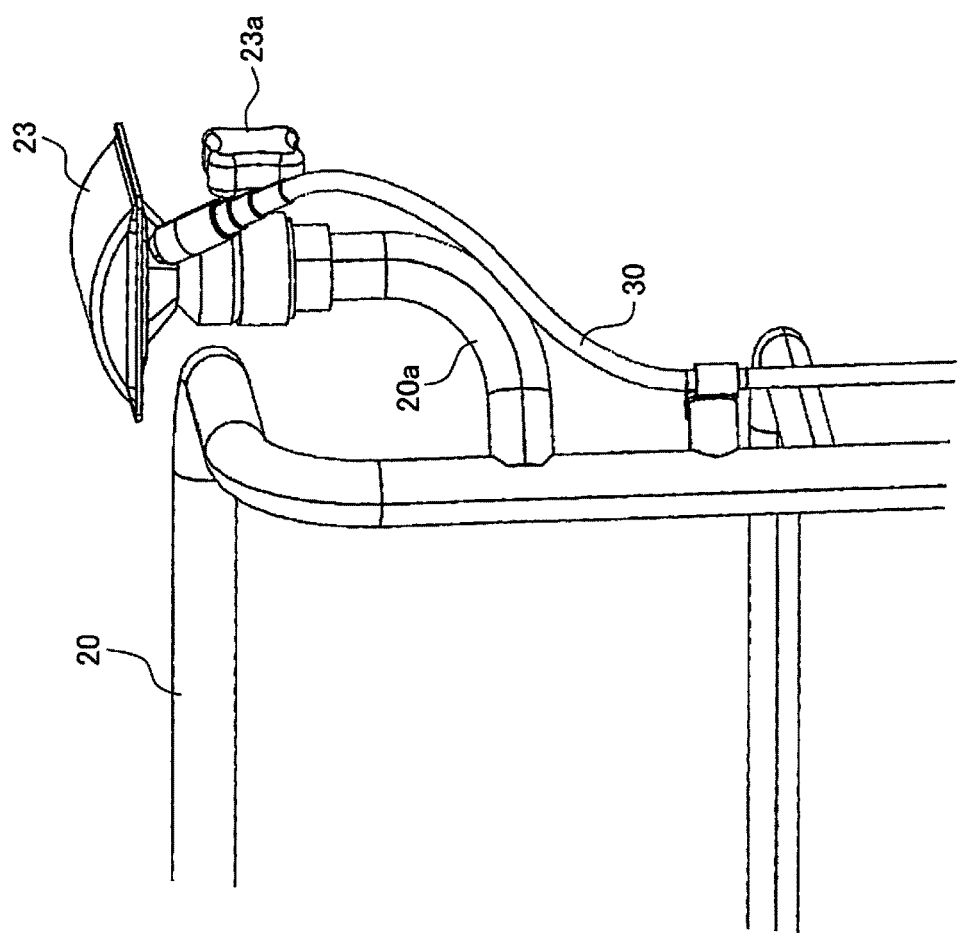
FIG. 4 illustrates a configuration of the pair of antenna supporting parts.
Figure 5:
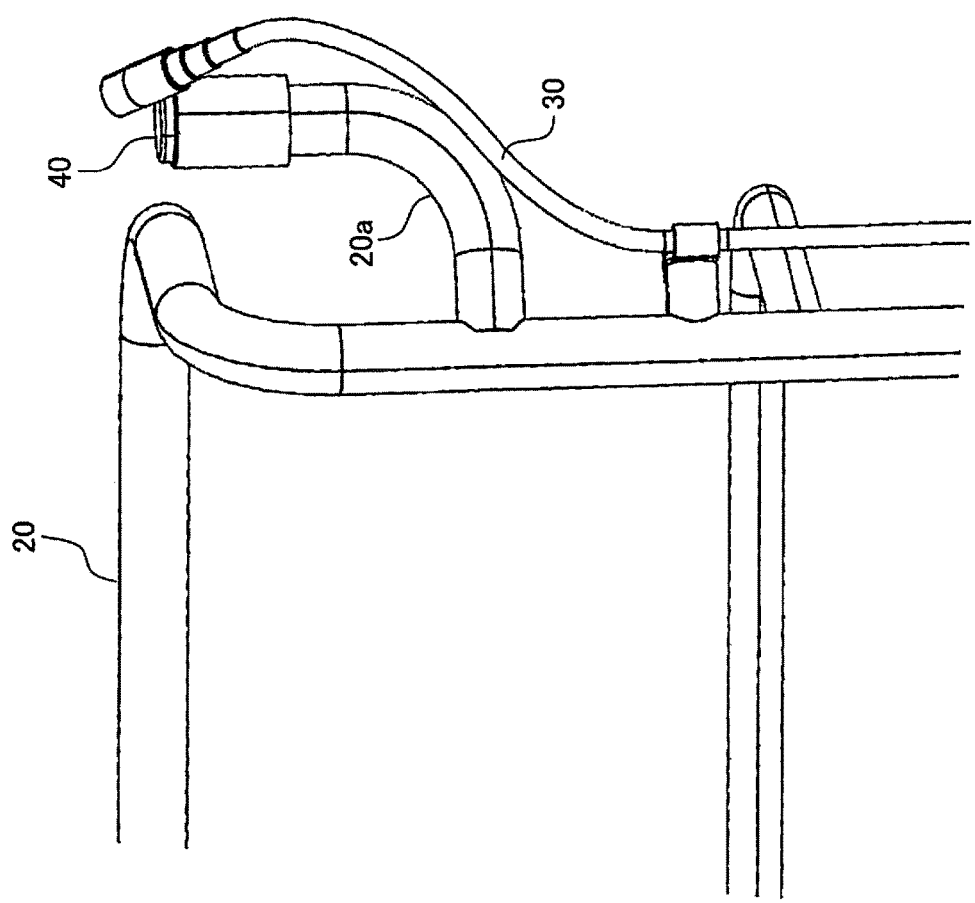
FIG. 5 illustrates a configuration of the pair of antenna supporting parts.

FIG. 4 illustrates a condition in which the second GNSS antenna 23 is attached to the second antenna supporting part 20*a*. FIG. 5 illustrates a condition in which the second GNSS antenna 23 is removed from the second antenna supporting part 20*a*.

The second antenna supporting part 20*a* is a bracket configured by a circular tube bent into an L shape. The second antenna supporting part 20*a* extends backward and upward from the rear part of the second handrail 20. The second antenna supporting part 20*a* is disposed on the side opposite to the passage 18 with the second handrail 20 interposed therebetween since the passage 18 is in front of the rear part of the second handrail 20. Since the second GNSS antenna 23 is to the outside of the passage with the handrail interposed therebetween due to this disposition, unexpected contact with the second GNSS antenna 23 due to someone moving along the passage can be avoided. The height of the second antenna supporting part 20*a* is preferably similar to that of the second handrail 20.

As illustrated in FIG. 4, the second GNSS antenna 23 is disposed on the second antenna supporting part 20*a*. The second GNSS antenna 23 is preferably disposed in a position higher than the second handrail 20 in order to properly receive GNSS satellite radio waves. The second GNSS antenna 23 has a knob 23*a* for connecting the second GNSS antenna 23 to the second antenna supporting part 20*a*. A cable 30 for transmitting position information to a controller is connected to the second GNSS antenna 23.

The second GNSS antenna 23 is preferably disposed in a position higher than the upper surface of the cab 16 in order to properly receive GNSS satellite radio waves.

As illustrated in FIG. 5, a cap 40 is fitted onto the second antenna supporting part 20*a* when the second GNSS antenna 23 is removed.

The front side portions of the first and second antenna supporting parts 19*a*, 20*a* are located between the engine compartment 13 and the cab 16 in the front-back direction.

Therefore, the first and second GNSS antennas 22, 23 can be located closer to the center of rotation CP than a case in which the first and second antenna supporting parts 19*a*, 20*a* are disposed on the counterweight 12. As a result, the first and second antenna supporting parts 19*a*, 20*a* that respectively support the first and second GNSS antennas 22, 23 can be made smaller since the acceleration applied to the first and second GNSS antennas 22, 23 when the rotation of the upper revolving unit 12 starts or stops can be reduced.

The first and second antenna supporting parts 19*a*, 20*a* are respectively connected to the first and second handrails 19, 20.

Therefore, there is no need to provide separate members to support the first and second antenna supporting parts 19*a*, 20*a*.

The first and second antenna supporting parts 19*a*, 20*a* are disposed on the right and left relative to the center line CL in the front-rear direction, as shown in FIG. 3.

Therefore, the first and second GNSS antennas 22, 23 are disposed away from each other on the left and right relative to the center line CL. As a result, the positional coordinates of the hydraulic excavator 100 can be calculated with high precision on the basis of the position information of the first and second GNSS antennas 22, 23.

The first and second GNSS antennas 22, 23 (example of a pair of antennas) are removably attached to the first and second antenna supporting parts 19*a*, 20*a*.

Therefore, the operator is able to easily attach or remove the first and second GNSS antennas 22, 23 when starting or finishing work.

Other Exemplary Embodiments

While the present invention has been described with the embodiment provided above, the description and drawings form a portion of the disclosure and are not to be understood as limiting the invention. Various substitutions, embodiments, and operation techniques will be apparent to those skilled in the art.

While only the front side portions of the first and second antenna supporting parts 19*a*, 20*a* are located between the engine compartment 13 and the cab 16 in the front-back direction in the above embodiment, the present invention is not limited as such. All parts of the first and second antenna supporting parts 19a, 20a may be located between the engine compartment 13 and the cab 16 in the front-back direction. Moreover, only the rear side portions of the first and second antenna supporting parts 19a, 20a may be located between the engine compartment 13 and the cab 16 in the front-back direction.

While the first and second GNSS antennas 22, 23 are respectively attached in a detachable manner to the first and second antenna supporting parts 19a, 20a in the above embodiment, the present invention is not limited as such. The first and second GNSS antennas 22, 23 may be respectively fixed to the first and second antenna supporting parts 19a, 20a.

While the first and second antenna supporting parts 19a, 20a are connected respectively to the pair of handrails 19, 20 in the above embodiment, the present invention is not limited as such. The first and second antenna supporting parts 19a, 20a may be connected directly onto the equipment compartment 14 and the like.

While the first and second antenna supporting parts 19a, 20a are positioned respectively to the rear of the first and second handrails 19, 20 in the above embodiment, the present invention is not limited as such. The first and second antenna supporting parts 19a, 20a may be respectively positioned in front of or to the side the first and second handrails 19, 20.

While the first and second antenna supporting parts 19a, 20a are described as being configured separately from the first and second handrails 19, 20 in the above embodiment, the first and second antenna supporting parts 19a, 20a may respectively be a portion of the first and second handrails 19, 20.

As described above, it is a matter of course that the present invention incorporates a variety of preferred embodiments which are not described herein. Hence the technical scope of the present invention is defined only by matters to define the invention, which are according to the scope of claims, reasonable from the above description.

The present invention is useful in the field of hydraulic excavators since the antennas can be supported by small antenna supporting parts according to the hydraulic excavator of the present invention.

What is claimed is:

1. A hydraulic excavator, comprising:
   a lower traveling unit;
   an upper revolving unit revolvably mounted on the lower traveling unit;
   a counterweight disposed on a rear end part of the upper revolving unit; and
   a first GNSS antenna supporting part configured to support a first GNSS antenna, the first GNSS antenna supporting part being disposed in front of the counterweight on the upper revolving unit; and
   an engine room disposed in front of the counterweight on the upper revolving unit, the first GNSS antenna supporting part being disposed in front of the engine room.

2. The hydraulic excavator according to claim 1, further comprising
   a handrail disposed in front of the first GNSS antenna supporting part on the upper revolving unit.

3. The hydraulic excavator according to claim 2, wherein the handrail is disposed on an edge of a passage on the upper revolving unit.

4. The hydraulic excavator according to claim 1, wherein the first GNSS antenna supporting part is disposed on a right side of a front-rear center line of a vehicle body.

5. The hydraulic excavator according to claim 1, further comprising
   a second GNSS antenna supporting part configured to support a second GNSS antenna, the second GNSS antenna supporting part being disposed on a left side of the front-rear center line of the vehicle body and being disposed in front of the engine room.

6. The hydraulic excavator according to claim 5, further comprising
   a cab disposed in front of the counterweight on the upper revolving unit;
   the second GNSS antenna supporting part being disposed between the counterweight and the cab.

7. A hydraulic excavator, comprising:
   a lower traveling unit;
   an upper revolving unit revolvably mounted on the lower traveling unit;
   a counterweight disposed on a rear end part of the upper revolving unit;
   a structure disposed in front of the counterweight on the upper revolving unit, an upper surface of the structure having a substantially flat area;
   a first GNSS antenna supporting part configured to support a first GNSS antenna;
   a second GNSS antenna supporting part configured to support a second GNSS antenna; and
   an engine room disposed between the counterweight and the structure on the upper revolving unit, each of the first and second GNSS antenna supporting parts being disposed above the substantially flat area in front of the engine room.

8. The hydraulic excavator according to claim 7, wherein the first GNSS antenna supporting part is disposed on a right side of a front-rear center line of the hydraulic excavator, and
   the second GNSS antenna supporting part is disposed on a left side of the front-rear center line.

9. The hydraulic excavator according to claim 8, wherein each of the first and second GNSS antenna supporting parts is disposed on an edge of the substantially flat area.

10. The hydraulic excavator according to claim 9, wherein a handrail disposed in front of at least one of the first and second GNSS antenna supporting parts on the upper revolving unit.

11. The hydraulic excavator according to claim 8, further comprising
   a handrail disposed in front of at least one of the first and second GNSS antenna supporting parts on the upper revolving unit.

12. A hydraulic excavator, comprising:
   a lower traveling unit;
   an upper revolving unit revolvably mounted on the lower traveling unit;
   a counterweight disposed on a rear end part of the upper revolving unit;
   an engine room disposed in front of the counterweight on the upper revolving unit;
   a cab disposed in front of the counterweight on the upper revolving unit;
   a first GNSS antenna supporting part configured to support a first GNSS antenna, the first GNSS antenna supporting part being disposed on a right side of a front-rear center line of a vehicle body and being disposed in front of the engine room; and a second GNSS antenna supporting part configured to support a second GNSS antenna, the second GNSS antenna supporting part being disposed on a left side of the front-rear center line of the vehicle body and being disposed between the counterweight and the cab.

* * * * *